United States Patent
Lu et al.

(10) Patent No.: US 10,808,072 B2
(45) Date of Patent: Oct. 20, 2020

(54) CURABLE ADHESIVE COMPOSITIONS AND USE THEREOF

(71) Applicant: HENKEL IP & HOLDING GMBH, Duesseldorf (DE)

(72) Inventors: Victor X. Lu, Marietta, GA (US); Chunzhao Li, Vernon Hills, IL (US)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 0 days.

(21) Appl. No.: 15/292,626

(22) Filed: Oct. 13, 2016

(65) Prior Publication Data

US 2017/0029559 A1 Feb. 2, 2017

Related U.S. Application Data

(63) Continuation of application No. PCT/US2015/025281, filed on Apr. 10, 2015.

(60) Provisional application No. 61/982,009, filed on Apr. 21, 2014.

(51) Int. Cl.
| | |
|---|---|
| *C08G 63/08* | (2006.01) |
| *C09D 133/06* | (2006.01) |
| *C09D 139/04* | (2006.01) |
| *C09D 133/24* | (2006.01) |
| *C09J 167/04* | (2006.01) |
| *C08F 220/18* | (2006.01) |

(52) U.S. Cl.
CPC ............ *C08G 63/08* (2013.01); *C09D 133/06* (2013.01); *C09D 133/066* (2013.01); *C09D 133/24* (2013.01); *C09D 139/04* (2013.01); *C09J 167/04* (2013.01); *C08F 220/1804* (2020.02); *C08L 2312/00* (2013.01); *C09J 2301/416* (2020.08)

(58) Field of Classification Search
CPC .... C08G 63/08; C09D 133/06; C09D 133/24; C09D 139/04; C08F 220/1804; C09J 167/04
See application file for complete search history.

(56) References Cited

U.S. PATENT DOCUMENTS

| | | | |
|---|---|---|---|
| 4,181,752 A | 1/1980 | Martens et al. | |
| 4,364,972 A | 12/1982 | Moon | |
| 5,625,225 A | 6/1997 | Huang et al. | |
| 5,879,759 A | 3/1999 | Zang | |
| 6,455,121 B1 | 9/2002 | Ha et al. | |
| 8,440,304 B2 | 5/2013 | Paul et al. | |
| 2013/0251912 A1 | 9/2013 | Clark et al. | |
| 2014/0186541 A1* | 7/2014 | Clark .................... | C08F 265/06 427/505 |

FOREIGN PATENT DOCUMENTS

| | | |
|---|---|---|
| CN | 102791744 A | 6/2016 |
| EP | 1201690 A2 | 5/2002 |
| EP | 1676870 A1 | 7/2006 |
| EP | 2548901 A1 | 1/2013 |
| JP | 59-196304 A | 11/1984 |
| JP | 63-254105 A | 10/1988 |
| JP | 2-270844 A | 11/1990 |
| JP | 9-20729 A | 1/1997 |
| JP | 2003-523418 A | 8/2003 |
| JP | 2013-205809 A | 10/2013 |
| TW | 201016731 A1 | 5/2010 |
| WO | 2013010813 A1 | 1/2013 |

OTHER PUBLICATIONS

Czech, Zbigniew, et al. "Photoreactive pressure-sensitive adhesive hotmelts based on acrylics." CHEMIK, 2014, 68, 1, pp. 53-60.

* cited by examiner

*Primary Examiner* — Sanza L. McClendon
(74) *Attorney, Agent, or Firm* — Sun Hee Lehmann

(57) ABSTRACT

A solvent-less hybrid curable composition is prepared from grafting polyesters or polyamides onto a (meth)acrylic copolymer backbone. Besides the many benefits of a solvent-less system, the hybrid curable composition forms strong adhesion to polar substrates, widens the use temperatures, and enables faster processing speeds than conventional hybrid curable compositions. The solvent-less hybrid curable composition forms an optically clear single phase that is suitable as tapes and labels, or in electronic, optoelectronic, OLED and photovoltaic devices, and the like.

4 Claims, No Drawings

CURABLE ADHESIVE COMPOSITIONS AND USE THEREOF

FIELD OF THE INVENTION

The present invention relates to curable hybrid acrylic-polyester or acrylic-polyamide adhesives and/or pressure sensitive adhesives. More particularly the hybrid adhesives are optically clear, making these adhesives particularly well suited for variety of bonding applications.

BACKGROUND OF THE INVENTION

Solvent-based curable adhesives, particularly solvent based pressure sensitive adhesives are widely known. However, solvent based curable adhesives suffer from a number of shortcomings, including longer production time, higher energy consumption, difficulties in the control of production process and final product quality. Moreover, complete removal of solvent from the solvent-based curable adhesives is challenging, which can result in emission of solvent vapors and outgassing issues in the final product and during use. The final product may not be aligned with current concerns for industry to reduce solvent and volatile organic solvents.

Another drawback associated with solvent-based curable adhesives is its inability to form a thicker coating layer at a single application pass. Multiple passes are typically required to remove solvent for coating thicknesses greater than 100 microns for solvent-based curable adhesives. Heat is often applied to drive the solvent off of the solvent-based curable adhesives, yet high application temperature or prolonged heating can lead to premature curing in the application equipment.

Solvent-less system is desirable for curable adhesives because it offers a 100% conversion rates with safer and more economical means.

While some solvent-less systems, such as hybrid adhesives, are available on the market, they have poor performances. Acrylic-polyester based hybrid copolymers have poor performances and appearances. Polyester portions of the copolymer can crystallize out of the copolymers, leading to incompatibility and poor performances as an adhesive.

U.S. Pat. Nos. 4,181,752 and 4,364,972 describe a system wherein a coatable syrup is formed by small degree of prepolymerizing a monomer mixture. The syrup contains a large quantity of unreacted monomers, which must be irradiated to undergo polymerization.

U.S. Pat. No. 5,879,759 describes a copolymer formed by first partially polymerizing a monomer mixture with irradiation and then adding additional monomers or oligomers and further irradiating the mixture. The resultant polymer, however, cannot build high molecular weight in the curing time frames and thus, desirable high performances cannot be achieved.

EP 2548901 describes a radiation curable composition comprising a (meth)acrylic copolymer A and a radiation curable compound B, wherein the process involves a first copolymerization step and then a subsequent ring opening step. One major drawback to this composition is incompatibility of the radiation curable compound B with the (meth)acrylic copolymer A. In addition, the rheology profile of the radiation curable compound B has insufficient pressure sensitivity.

Similarly, U.S. Patent Publication 2013/0251912 describes a mixture of a (meth)acrylic copolymer and a UV curable oligomer. The mixture can lead to immiscibility over time, leading to poor adhesive performances.

There is a need in the art to overcome the disadvantages and limitations that exist with solvent-based and curable hybrid copolymer adhesives and/or pressure sensitive adhesives. The current invention fulfills this need.

BRIEF SUMMARY OF THE INVENTION

The present invention relates to solvent-less hybrid curable composition prepared from grafting polyesters or polyamides onto acrylic copolymer backbones. The solvent-less hybrid curable composition forms a single phase that is optically clear. Unlike the conventional linear hybrid curable compositions, the inventive grafted hybrid curable composition forms strong adhesion to polar substrates, widens use temperatures, and enables faster processing speeds than conventional non-hybrid compositions.

In one embodiment, there is provided a solvent-less, curable composition comprising a hybrid copolymer having a meth(acrylic copolymer) backbone and a plurality of a monomer or an oligomer grafted onto the meth(acrylic copolymer) backbone. The monomer or the oligomer comprises at least one —O— or —NH— functional group.

Another embodiment provides a solvent-less, hybrid curable composition comprising a plurality of oligomeric side chains grafted onto a (meth)acrylic copolymer backbone. The (meth)acrylic copolymer backbone comprises (meth) acrylic monomers and hydroxyl group containing monomers. The oligomeric side chain is a polyester or a polyamide.

Yet another embodiment provides a process for forming a hybrid copolymer comprising the steps of (1) copolymerizing an acrylic copolymer backbone comprising: (i) a (meth) acrylic monomer, (ii) a hydroxyl group containing monomer and (iii) a cyclic compound having at least one functional group, —O— or —NH—, in the cyclic structure; and (2) opening the cyclic compound with a catalyst, whereby the cyclic compound is grafted on the acrylic copolymer backbone.

DETAILED DESCRIPTION OF THE INVENTION

All disclosure of all documents cited herein are incorporated in their entireties by reference.

Acrylic copolymers are incompatible with polyesters and polyamides, and when combined, they form a hazy appearance because one of the copolymers crystallize out of the mixture. Unlike the mixture, the solvent-less hybrid curable composition is completely miscible and forms a single phase without any separation or haziness. The hybrid may be used for optically clear applications and has superior adhesive performances than conventional mixtures of acrylic and other polymer systems.

The solvent-less, curable hybrid copolymer is prepared from a (meth)acrylic copolymer backbone and a plurality of monomers or oligomers that comprises an —O— or —NH— functional group. The backbone of the curable hybrid copolymer is formed by a meth(acrylic monomer) (A1) and a copolymerizable hydroxyl group containing monomer (A2).

The term "(meth)acryl" is to be understood as to encompass both the terms "acryl" and "methacryl" and refers to compounds comprising at least one acrylate group (CH2=CHCOO—) and/or at least one methacrylate group (CH2=CCH3COO—). The alkyl(meth)acrylates are preferably selected from linear and branched aliphatic alkyl (meth)acrylates.

The (meth)acrylic monomer (A1) is generally used in an amount from about 30 to about 99 wt % based on the sum of the hybrid copolymer mixture. The amount of (meth) acrylic monomer (A1) is preferably at least about 40 wt %, more preferably at least 50 wt %, preferably up to about 95 wt %, more preferably up to about 90 wt % based on the sum of the hybrid copolymer mixture.

The alkyl(meth)acrylates are preferably selected from linear and branched aliphatic alkyl(meth)acrylates, more preferably from those having from 3 to 20 carbon atoms in the alkyl group. Particularly preferred are methyl methacrylate, n-butylacrylate, iso-butylacrylate, 2-ethyl hexylacrylate, isobutyl methacrylate, methoxy polyethylene glycol acrylate (average Mn 350), and mixtures thereof.

The copolymerizable hydroxyl group containing monomer (A2) is generally used in an amount of about 1 to about 30 wt % based on the sum of the hybrid copolymer mixture. The amount of copolymerizable hydroxyl group containing monomer (A2) used is preferably at least about 1 wt %, more preferably at least about 5 wt %, and up to about 30 wt %, and more preferably up to about 20 wt % based on the sum of the hybrid copolymer mixture.

The copolymerizable hydroxyl group containing monomer (A2) contains at least one hydroxyl functional group that can react with the cyclic compound (B) during the ring opening reaction step. The copolymerizable hydroxyl group containing monomer contains a hydroxyl group either in an aromatic or an aliphatic form. Preferred hydroxyl group containing monomer (A2) include hydroxyalkyl(meth)acrylates, the ethoxylated and/or propoxylated derivatives thereof, the adducts thereof with lactones, polyalkoxy monohydroxy mono(meth)acrylates. Particularly preferred are hydroxyalkyl(meth)acrylates having from 1 to 20 carbon atoms in the alkyl group, the ethoxylated and/or propoxylated derivatives thereof, the adducts thereof with lactones, polyalkoxy monohydroxy mono(meth)acrylates. Examples of such compounds comprise hydroxyethyl(meth)acrylate, hydroxypropyl(meth)acrylate, hydroxybutyl(meth)acrylate, hydroxypentyl(meth)acrylate, hydroxyheptyl(meth)acrylate, hydroxynonyl(meth)acrylate, hydroxydecyl(meth)acrylate, their position isomers, the ethoxylated and/or propoxylated derivatives thereof, the adducts thereof with lactones, diethylene glycol mono(meth)acrylate, polyethylene glycol mono(meth)acrylate, propylene glycol mono(meth)acrylate, polypropylene glycol mono(meth)acrylate.

Another preferred hydroxyl group containing monomer (A2) include phenol groups, such as 4-vinylphenol.

Another preferred hydroxyl group containing monomer (A2) are those containing carboxylic acid groups, and mixtures of any of them. Examples of such compounds are (meth)acrylic acid, β-carboxyethyl(meth)acrylate, crotonic acid, maleic acid, fumaric acid, itaconic acid. Mixtures of any of the above copolymerizable monomers can be used. More preferred copolymerizable monomers are 2-hydroxyethyl(meth)acrylate, 2-hydroxybutyl(meth)acrylate, 4-hydroxybutyl(meth)acrylate, and mixtures thereof. Most preferred are 2-hydroxyethylacrylate, 2-hydroxybutylacrylate, 4-hydroxybutylacrylate, and mixtures thereof.

Optionally, the backbone may further comprises additional copolymerizable monomers. The optional copolymerizable monomer (A3) may be added up to 60 wt % of the backbone, preferably up to 50 wt %, more preferably up to 40 wt % based on the sum of the hybrid copolymer mixture. The copolymerizable monomer (A3) is generally a compound containing at least one copolymerizable carbon-carbon double bond. Copolymerizable carbon-carbon double bonds are known to the skilled person and include (meth)acrylate, vinyl, allyl types of double bonds. Suitable copolymerizable monomers (A3) are linear and branched aliphatic alkyl(meth)acrylates, especially those having from 1 to 20 carbon atoms in the alkyl group, glycidyl(meth) acrylate, vinyl acetate, styrene and mixtures thereof. Particularly preferred are methyl(meth)acrylate, ethyl(meth) acrylate, tert-butyl(meth)acrylate, vinyl acetate, styrene and mixtures thereof.

In another embodiment, the optional copolymerizable monomer contains a photoinitiator group in the monomer, in an amount of up to about 10 wt %, and preferably up to about 3 wt %, based on the sum of the hybrid copolymer mixture. Exemplary copolymzerizable monomers containing photoinitiator groups include 2-(4-benzyol-3-hydroxyphenoxy)ethyl acrylate, benzoin acrylate, 2-hydroxy-1-[4-(2-acryloyloxyethoxy)phenyl]-2-methyl-1-propanone, 4-acryloyloxy benzophenone, and mixture of 4-acryloyloxyoligoethylenoxy carbonyl-benzophenones. Also preferred photoinitiator containing coolymerizable monomers include those taught in EP 167870.

The backbone is formed by copolymerizing the (meth) acrylic monomer (A1) and the copolymerizable hydroxyl group containing monomer (A2). The copolymer may be a random, alternating or block copolymer. It is preferably a random copolymer. The copolymerization in the copolymerization step may take place by free-radical copolymerization. This may take place in a manner known to the skilled person by conventional methods, particularly by free-radical polymerization using thermal radical initiators. Examples of suitable thermal radical initiators include peroxides, such as benzoyl peroxide, azo compounds, such as azo-bis-isobutyronitrile, azo-bis-dimethylpentanenitrile, azo-bis-methylbutyronitrile, azo-bis-cyanocyclohexane. The initiators may be used, for example, in amounts from 0.05 to 2.0 wt % based on the sum of the hybrid copolymer mixture.

To achieve a good control of the molecular weight and its distribution, a chain transfer agent, preferably of the mercaptan type, such as n-dodecylmercaptan, tert-dodecanethiol, iso-octylmercaptan, n-octylmercaptan or of the carbon halide type, such as carbon tetrabromide, bromotrichloromethane, can also be added in the course of the reaction. The chain transfer agent is generally used in amounts of up to 5 wt % based on the sum of the hybrid copolymer mixture.

The copolymerization is generally carried out at a temperature from 60 to 150° C., preferably under an inert gas atmosphere. The copolymerization is preferably carried out at a temperature from 60 to 100° C.

The backbone copolymerization is followed by a subsequent step of opening the cyclic compound. The ring opening step grafts the cyclic compound B onto the (meth)acrylic polymer backbone. The cyclic compound is grafted at the hydroxyl group of the (meth)acrylic polymer backbone. The cyclic compound having at least one functional group X in the cyclic structure, where X is —O— or —NH—. The amount of cyclic compound having a functional group (B) used is preferably at least 5 wt %, more preferably at least 10 wt %, preferably up to 30 wt %, more preferably up to 60 wt %, based on the sum of the hybrid copolymer mixture. Preferred cyclic compounds include lactones, lactams, lactides, cyclic carbonates and mixtures thereof. Preferred cyclic compounds B are lactones and lactides and mixtures thereof. Particularly preferred are lactones such as L(−) lactide, ε-caprolactone, δ-valerolactone, γ-butyrolactone, and lactones of hydroxycarboxylic acids such as 2-hydroxycarboxylic acids, e.g. glycolic acid and lactic acid, 3-hydroxycarboxylic acids, e.g. 3-hydroxypropionic acid, 3-hydroxybutyric acid, 3-hydroxyvaleric acid and hydroxypivalic acid. More preferred are ε-caprolactone, δ-valerolactone, γ-butyrolactone and mixtures thereof, most preferred is ε-caprolactone.

The ring opening step is generally carried out at room temperature to up to about 150° C. The ring opening reaction can take place without the use of a catalyst, but the reaction rate can be increased with the addition of the catalyst. Therefore, the ring opening reaction preferably takes place in the presence of at least one catalyst. Suitable catalysts include alkali or alkaline earth metal alkoxides, organic acids, inorganic acids and Lewis acids such as sodium methoxide, calcium methoxide, aluminum isopropoxide, tetraalkyl titanates, titanium chelates, titanium acylates, lead salts, lead oxides, zinc borate, antimony oxide, stannous octoate, tin laurate, tin octoate, dibutyl tin dilurate, sulfuric acid, hydrochloric acid, phosphoric acid, boron trifluoride. Another preferred catalyst include yttrium alkoxides and lanthanum alkoxides, both of which can be used to carry out the ring opening step at room temperature. The catalyst can be used in amounts of up to 1% based on the sum of the hybrid copolymer mixture.

The resultant hybrid copolymer contains a random copolymer of (meth)acrylic copolymers and a plurality oligomeric arms grafted onto the backbone. The backbone contains hydroxyl or amine terminal functional groups in the oligomeric arms.

The hybrid curable copolymer can be used as is, or can be further formulated and mixed with other components.

Additional monomers such as UV-curable monomer and UV-curable resin can be added to the hybrid curable copolymer. The mixture can then be irradiated to crosslink the mixture. In another embodiment, the hybrid curable copolymer backbone can be thermally cured with the addition of isocyanate and/or melamine crosslinkers.

Optionally, tackifier, photointiator, stabilizer, viscosity modifiers may be added to the hybrid curable copolymer. They may be added in amounts known in the art to impart specific performances to the cured composition.

The crosslinked hybrid composition forms strong bonds with polar substrates, and particularly with PVC, glass, polyester polyurethane foam, and the like. The grafted polyester or polyamide side chains of the crosslinked (meth) acrylic polymer forms hydrogen bonds with polar substrates and stronger adhesion is formed.

The crosslinked hybrid composition is also optically clear and remains in a single phase. Polyesters or polyamide in the hybrid composition does not crystalize out of the hybrid polymer. Due to the optically clear properties, the hybrid composition is suitable in many applications such as labels or tapes; electronics, optoelectronics, OLEDs, photovoltaic devices; and the like. Because the hybrid composition remains in a single phase, and peel, tack and shear performances remain superior, especially on polar substrates.

The hybrid composition also has wider use temperature since the viscosity of the grafted hybrid composition is lower than the non-hybrid, linear-chain copolymer at the same temperature. Some benefits associated with lower viscosity of the hybrid compositions include faster coating speeds, faster processing speeds, easier filtration, lower thermal degradation and better levering of the coated substrate surfaces. Moreover, the hybrid composition can be manufactured and coated at lower temperatures, which decreases overall carbon footprint.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLES

Peel strength was measured by performing a 180° peel test on stainless steel panels using an Instron. About 1.0 mil thick coating of the adhesive was applied on to silicone release paper using heated rollers and bonded to Mylar film. Three specimens each 1" by 1" in dimensions were cut perpendicular to the machine direction from the coated Mylar. After conditioning overnight at 72° F. and 50% relative humidity, the release paper was removed and the specimens are bonded to stainless steel panels. The bonds are then rolled using a 4.5 lb. roller. After conditioning the bonds for about 20 minutes, the bonds were peeled in the Instron at 2"/minute. The stainless steel panel was in the stationary jaw, and the Mylar was in the movable jaw. The results are reported as an average load in oz/in. This test was repeated after conditioning for 24 hours.

For shear measurement, about 1.0 mil thick coating of the adhesive was applied on to silicone release paper using heated rollers and bonded to Mylar film. The lamination was cut to 1 by ½ inch strips. The release paper is removed and the Mylar bonded to stainless steel. A one mil transfer coating of the adhesive was made using heated rollers and a 1.0 by 0.5 inch strip of the specimen was bonded to a stainless steel plate. The bonds were then rolled using a 4.5 lb roller. After conditioning the bonds for about five hours, the plates are secured onto the shear test stand a 1000 gram weight is applied to each plate. The time that the specimen takes to slip from the plate was recorded as shear strength.

Solvent-less, curable hybrid compositions were made in accordance with the following components and processes and irradiated with UV radiation to form cured hybrid compositions.

Example 1

In a one-liter, four-neck glass reaction flask equipped with a stirrer, a water cooled condenser and an inlet for nitrogen and a thermoprobe mounted in the flask which is attached to a thermoregulator for mass temperature control, Solution 1 was charged to the flask and the content was heated to 70° C. The temperature was kept at 70° C. for 60 minutes under continuous agitation. The nitrogen purged through the flask at a moderate rate. The Solution 2 was then added to the reaction vessel over 80 minutes period while the temperature was continuously kept at 70° C. After the addition of the Solution 3, the reaction was kept at 70° C. for 60 minutes and then at 80° C. for another 60 minutes. The solution was then charged to the flask under agitation and the reaction was carried at 115° C. for 5 hours.

| Solution 1 | Amounts (g) |
| --- | --- |
| caprolactone | 80.0 |
| 2-ethylhexyl acrylate and/or Isobutyl methacrylate | 104.0 |
| 2-hydroxethyl acrylate | 12.0 |
| photoinitiator | 0.1 |

| Solution 1 | Amounts (g) |
|---|---|
| Chain transfer agent | 0.4 |
| Initiator | 0.4 |

| Solution 2 | Amounts (g) |
|---|---|
| 2-ethylhexyl acrylate and/or Isobutyl methacrylate | 104.0 |
| methoxy polyethylene glycol acrylate (350 mw), | 2.0 |
| 2-hydroxethyl acrylate | 12 |
| photoinitiator | 0.7 |
| Chain transfer agent | 0.7 |
| initiator | 0.4 |

| Solution 3 | Amounts (g) |
|---|---|
| Hydroxyl butyl acrylate | 9.8 |
| stabilizer | 0.15 |
| catalyst | 0.015 |

The final polymer was a colorless and optically clear, without any separation of phases.

A 25 microns thick coating was first coated onto a PET film and then cured under H-bulb (Fusion System) with 40 mJ/cm2 UVC radiation. The cured coating had the following properties:
(a) 20 min peel on stainless steel panel: about 41.1 oz/inch
(b) 24 h peel on stainless steel panel: about 44.0 oz/inch
(c) Shear at room temperature (4.4 psi): about 4.8 hours The cured hybrid copolymer, when applied as coating was clean, water-white and remained clear at room temperature for over 6 months. The cured hybrid copolymer had good adhesion properties as adhesive coatings.

Example 2

In a one-liter, four-neck glass reaction flask equipped with a stirrer, a water cooled condenser and an inlet for nitrogen and a thermoprobe mounted in the flask which is attached to a thermoregulator for mass temperature control, Solution 1 was charged to the flask and the content was heated to 70° C. The Solution 2 was then added to the reaction vessel over 180 minutes period while the temperature was continuously kept at 70° C. After the addition of the Solution 2, the reaction was kept at 70° C. for 60 minutes and then at 80° C. for another 60 minutes. Following the 60 minutes hold, Solution 3 was charged to the reaction mixture under agitation and the reaction was carried at 105° C. for eight hours to finish the reaction.

| Solution 1 | Amounts (g) |
|---|---|
| Caprolactone | 56.00 |
| Initiator | 0.28 |

| Solution 2 | Amounts (g) |
|---|---|
| One or more selected from: 2-ethylhexyl acrylate, Isobutyl methacrylate, hydroxyl butyl acrylate | 286.72 |
|  | 50.40 |

| Solution 2 | Amounts (g) |
|---|---|
| Caprolactone | 67.20 |
| Chain transfer agent | 2.04 |
| Initiator | 1.48 |

| Components to Solution 3 | Amounts (g) |
|---|---|
| Viscosity modifier | 21.00 |
| Stabilizer | 0.19 |
| Catalyst | 0.07 |

One hundred parts of the reaction products were then formulated with 5 parts crosslinking monomer, 5 parts tackifying monomer, 10 parts viscosity modifier, and 0.3 parts photoinitiator.

A 175 microns thick coating coated onto a PET substrate and then was cured under H-bulb (Fusion System) with 950 mJ/cm2 UVA radiation.

The cured product was colorless and optically clear, without any separation of phases. The cured coating also had the following properties:
(a) 20 min peel on stainless steel panel: about 23.6 oz/inch; and
(b) 24 h peel on stainless steel panel: about 24.4 oz/inch.

Even with a thickness that is seven-folds greater than a typical adhesive coating, the cured product had good peel properties. The adhesive coating was then aged under each of the following conditions:
(1) Thermal aging in 85° C. oven for 500 hours;
(2) Weathering oven (60° C. and 95% RH) for 500 hours; or
(3) Accelerated UV radiation aging (QUV) for 500 hours.

All the adhesives remained colorless and optically clear, without any phase separation.

We claim:

1. A process forming a hybrid copolymer comprising the steps of:
   a) copolymerizing an acrylic copolymer backbone comprising:
      (i) a (meth)acrylic monomer,
      (ii) a hydroxyl group containing monomer and
      (iii) a cyclic compound having a polyester in the cyclic structure,
      (iv) a third (meth)acrylic monomer that contains a photoinitiator group
   b) opening the cyclic compound with a catalyst, whereby the cyclic compound is grafted on the acrylic copolymer backbone
   wherein the process is solvent-free.

2. The process of claim 1 wherein the hybrid copolymer comprises:
   (1) about 30 to about 99 wt % of the (meth)acrylic monomer;
   (2) about 1 to about 30 wt % of the hydroxyl group containing monomer;
   (3) about 5 to about 60 wt % of the cyclic compound; and
   (4) up to about 10 wt % of the third (meth)acrylic monomer;
   wherein the total wt % is 100 wt %.

3. The process of claim 1 further comprising the steps of:
(c) adding a UV-curable monomer, UV-curable resin, tackifier, plasticizer, photointiator, cross-linker, chain transfer reagent, and/or stabilizer; and
(d) irradiating the hybrid copolymer;
whereby a cured hybrid copolymer is formed.

4. The process of claim 2 further comprising the steps of:
(c) adding an isocyanate monomer, melamine crosslinker, tackifier, plasticizer, cross-linker, chain transfer reagent, and/or stabilizer; and
(d) thermally curing the hybrid copolymer;
whereby a cured hybrid copolymer is formed.

\* \* \* \* \*